Dec. 16, 1930.                    R. D. SCHNOOR                    1,785,329
                                FUEL SIGNAL DEVICE
                              Filed March 25, 1929
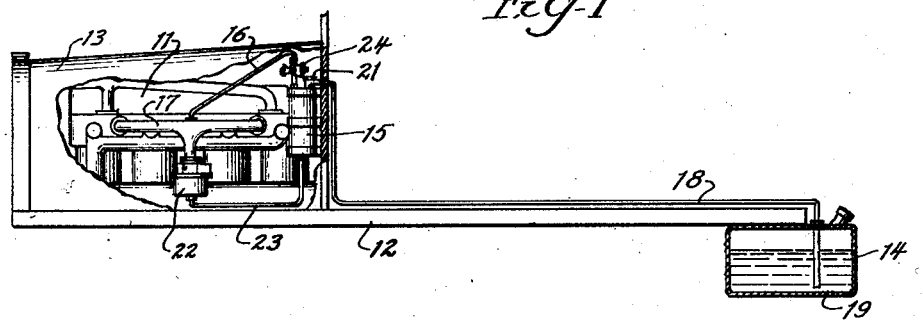
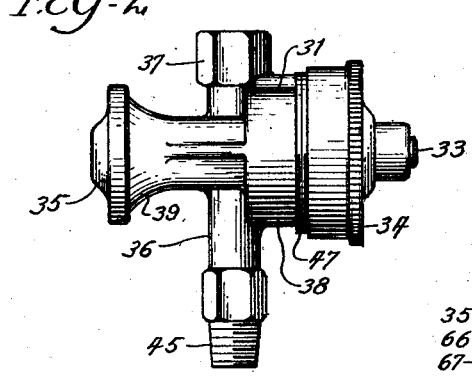
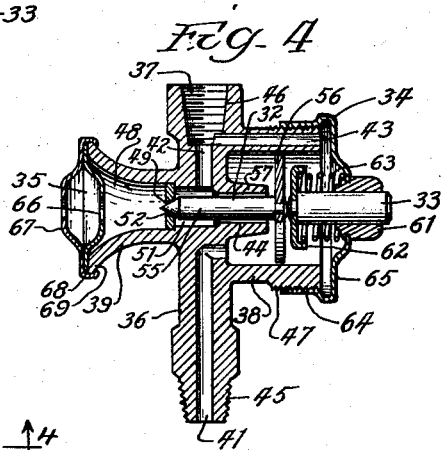
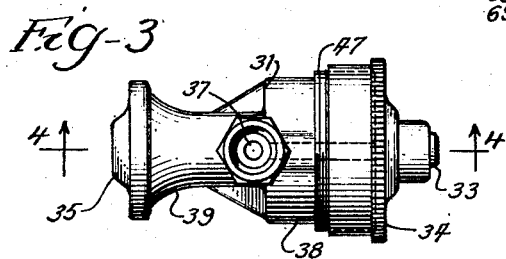
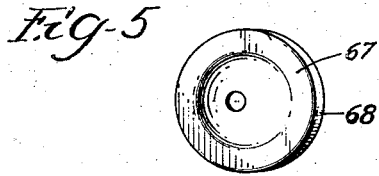
INVENTOR.
Raymond D. Schnoor Patented Dec. 16, 1930

1,785,329

UNITED STATES PATENT OFFICE

RAYMOND D. SCHNOOR, OF PARK RIDGE, ILLINOIS

FUEL-SIGNAL DEVICE

Application filed March 25, 1929. Serial No. 349,700.

This invention relates to a fuel signal device or a signal device for liquid fuel engines such as are in common use in automobiles and the like, and has for an object the provision of a simple and compact unitary device which may be readily attached to a gasoline driven motor car or the like for the purpose of warning an operator of the condition of the fuel supply when it is low and before it is exhausted, thus preventing the usual unfortunate circumstance of motor car stopping dead in hazardous places or in places remote from any fuel supply stations when their fuel supply becomes exhausted unexpectedly.

Another important object of the invention is to provide such a device which will warn an operator as to his fuel requirements in ample time to permit him to drive his car to the nearest supply station for fuel, even though the station may be several miles distant.

Another important object of the invention is to provide such a device which will positively attract the attention of an operator, without affecting the operation of the motor and which will not annoy the operator when fuel is not required.

Another important object of the invention is to provide such a device which may be readily adjusted to function on motor cars of different manufacture or having arrangements of unlike character or capacity.

Another important object of the invention is to provide such a device in which the moving part or parts are arranged horizontally, so that the operation of the device will not be materially affected by gravity or road shocks.

Numerous other objects and advantages of the invention will be apparent as it is better understood from the following description, which, taken in connection with the accompanying drawings, discloses a preferred embodiment thereof.

Referring to the drawings—

Figure 1 is a diagrammatic view of an automobile engine, its supply tanks and associated mechanism embodying my invention.

Fig. 2 is an elevational view of a preferred form of my fuel signal device.

Fig. 3 is a third angle projection of Fig. 2 showing the top of the device.

Fig. 4 is a section taken substantially on line 4—4 in Fig. 3 showing the operating parts of the device, and, Fig. 5 is a perspective view of a whistle part.

To illustrate my invention I have shown "Fig. 1" a diagrammatic view of an engine 11 of a type in common use in automobiles and mounted on a frame 12 upon which the usual body may be mounted. A hood 13 of the usual construction is broken away to show the engine 11 and other devices. The usual fuel supply tanks with which motor cars and the like are equipped include a main fuel storage tank 14 and a secondary supply tank 15. Fuel is drawn from the tank 14 to the tank 15 by the engine by means of a suction connection or vacuum through a tube 16 connected with an intake manifold 17 and the tank 15.

The tank 14 carries the bulk of the fuel supply and is usually suspended or otherwise attached to the frame 12 at a point remote from the engine, a fuel pipe or tube 18 which extends into the tank 14 to a point near its bottom surface 19 and is connected to the secondary tank 15 as indicated at 21 conducts fuel from the tank 14 to the tank 15. The tank 15 may be any type of intermediate or secondary storage tank that will feed a carbureter 22 or like fuel atomizing device through a tube 23 or the like, in the present instance I have shown a tank of the type commonly known as a vacuum tank, the tube 16 being the suction connection.

In the usual arrangement the tank 14 is located below the tank 15 and the carbureter 22 is also located below the tank 15, the fuel being periodically lifted from the tank 14 to the tank 15 and continuously fed by gravity from the tank 15 to the carbureter 22, the tank 15 being provided with float valve mechanism for controlling the flow. As above mentioned the fuel is lifted from the tank 14 and into the tank 15 by suction from the engine, through the tube 16, and a device embodying my invention is or may be associated with these mechanisms for signaling an operator when the regular flow of fuel is interrupted, as will now be described.

As above mentioned the vacuum is controlled by the tank 15 and is shut off when no fuel is required, when fuel is required the valve mechanism opens and gasoline is lifted, as long as there is sufficient supply in the tank 14. When fuel is being lifted, the weight thereof together with the frictional resistance of the walls of the tube 18, resist the vacuum and will hereinafter be considered and termed the load.

When the supply of fuel in the tank 14 gets low, if the vehicle is moving or unlevel the remaining fuel supply in flowing and splashing will not be accessible to the tube 18 at all times and the fuel load is periodically relieved while air is drawn through the tube 18, under all such conditions there is more fuel available if the machine is kept in motion so that the remaining fuel will splash and flow or periodically submerge the end of the tube 18. From the above it will be evident that a device associated with these tanks and devices and arranged to detect the absence of a load in the tube 18 or when air is taking the place of fuel, may be utilized to signal an operator and indicate, by intermittent or continuous signals, the condition of his fuel supply.

The device 24, which will now be described, is a preferred form of my invention and may be associated with the tube 16 in any suitable manner, in the present instance the device is connected between the tube 16 and the tank 15 and includes a housing or body part 31, a piston 32, a pressure plunger 33, a cap 34 and an alarm or whistle 35.

The body 31 may be of any suitable form and may be built up of separate parts upon occasion. In the present embodiment the body 31 is formed a solid casting, to provide a vacuum connection or stem 36, a suction connection or outlet 37, a cylinder 38, a horn 39, and air channels 41, 42, 43 and 44. The stem 36 may be of any suitable length and is preferably threaded as at 45 for connection to the tank 15. The outlet 37 is or may be similar to the stem 36 and is preferably provided with internal threads 46, corresponding with the threads 45 so that the device may be connected between the usual fitting on the tube 16 and the tank 15, without the use of special or additional fittings. The cylinder 38 may be of any suitable size and is preferably formed to provide a threaded portion 47 adjacent its open end. The horn 39 may be of any suitable size and shape that will provide a chamber 48 and that will permit of attaching the alarm or whistle 35. A valve seat 49, which forms a part of the alarm, is preferably pressed into the chamber 48, substantially as shown, providing a chamber 51. The valve seat 49 is formed to provide an opening 52 which is arranged to form a valve seat for controlling the whistle. It will be understood that other indicating devices may be readily substituted for the whistle and its control valve.

The piston 32 is preferably formed to provide a pointed stem or needle 55 and a head 56. The head 56 is preferably disc shaped and forms a free fitting piston in the cylinder 38. The stem 55 extends through the channel 44 and the chamber 51 for operating the alarm or to engage the valve seat 49, and is guided to the seat during closing action by a bearing portion 57 of the body 31. The piston 32 is preferably arranged horizontally substantially as shown so that the operation thereof will not be materially affected by gravity or road shocks.

The piston 33 is provided to normally hold the piston 32 in a normal position or against the seat 49, as may be accomplished by a spring interposed between the cap 34 and the piston 32, except that the piston 33 is preferably arranged for main or full actuation by atmospheric pressure so that the pressure of the plunger will vary directly with any variations in the suction or vacuum pressure. The piston 33 is slideably mounted in a bearing member 61 which is or may be suitably secured to the cap 34, as indicated. A flanged cap member 62 may be secured to the piston 33 and a light spring 63 may be mounted between the cap member 62 and the cap 34 to lightly urge the piston 33 against the piston 32 and in turn the piston 32 against the seat 52.

The cap 34 is preferably formed of sheet metal and to provide a threaded portion 64, for engaging the threaded portion 47 of the body 31, and an annular portion 65 arranged substantially parallel with the end surface of the cylinder 38. The bearing 61 may be secured to the cap 34 in any suitable manner.

The alarm whistle 35 may be any device that will signal an operator and is preferably a device that will generate a sound of a character different from any sound common to the machine upon which the device is used. In the present instance I have shown a disc whistle, formed of two centrally apertured discs. A disc 66 inwardly offset and formed to fit the end of the horn 39, and a disc 67 outwardly offset and provided with a flange 68 which may be curled over a rim 69 of the horn 39 for securing the whistle 35 to the horn and the above mentioned valve for controlling the flow of air through the discs.

In operation, the tube 16 is connected to the suction connection or outlet 37 and the stem 36 or vacuum connection is connected to the tank 15, as above described, therefore any air coming from the tank 15 passes through the channel 41 and into the cylinder at the left side Fig. 4 of the piston 56, and may pass out of the cylinder through the channels 43 and 44, the channel 43 drawing air from the space to the right of the piston 56 and the channel 44 drawing air from the space to the left Fig. 4. The channel 44 is of restricted size or of just sufficient size to carry the volume of air required to lift fuel. The channel 41 is somewhat larger, about double the size, and the channel 43 is also larger and preferably larger than the channel 41 to care for leakage, such as may occur at the bearing 61 and threaded connection between the cylinder 38 and the cap 34. The size of the channel 43 may be adjusted by adjusting the cap 34 to bring the portion 65 thereof toward or away from the end surface of the cylinder 38, upon which the channel opens. This adjustment permits adjustment of the device to various machines having unlike loads and the like.

When a motor with which this device is associated is running, vacuum pressure exists in all channels in the device, inside the needle valve which is held closed by atmospheric pressure through the pin 33. This position of the valve is shown Fig. 4 and is maintained while the valve mechanism of the tank 15 is closed and while it is open if fuel is available, since the channel 44 is capable of carrying off the volume of air incidental to this operation. If the fuel load is removed a larger volume of air will be received from the tank 15 which will exceed the capacity of the channel 44, and the excess volume is drawn by the channel 43 which has a larger capacity. Since the piston 56 is interposed between the channels 43 and 41, a vacuum pressure is developed to the right of the piston and lowered to the left of the piston by the added volume of air and the piston 56 moves to operate the alarm or to the right opening the channel 42 to the chamber 48 through the chamber 51 for operating the whistle 35, by lifting the valve pin 55 from the seat 49. The opening 52 is preferably of less diameter than the channel 42 so that there is still vacuum pressure within the device while the whistle operates and so that, if fuel is received from the tank 14, the whistle will be closed. The incidental drop in pressure due to operation of the whistle does not materially affect the the device, nor do the vacuum pressure changes due to variations of motor speed and acceleration, since the device operates on pressure developed by a volume of air passing through the channel 41 and into the cylinder 38 or through the device.

It is thought that the invention and many of its attendant advantages will be understood from the foregoing description, and it will be apparent that various changes may be made in the form, construction and arrangement of the parts, without departing from the spirit and scope of the invention, or sacrificing all of its material advantages, the form hereinbefore described being merely a preferred embodiment thereof.

I claim:

1. A device of the character described, comprising a housing, said housing having a suction connection, a vacuum connection, and a connection to the outside air, an alarm device in said last named connection, and a fluid controlled piston associated with and adapted to actuate said alarm device when a predetermined volume of fluid passes between said suction connection and said vacuum connection.

2. A device of the character described, comprising a housing, said housing having a suction connection, a vacuum connection, and at least one connection to the outside air, a signal device associated with said last-named connection including a valve controlling the connection, and a piston arranged in said housing and adapted for control by fluid passing through said housing to open and close said valve under predetermined conditions.

3. A device of the character described, comprising a housing, said housing having a suction connection, a vacuum connection, and at least one connection to the outside air, an alarm device associated with said last-named connection including a valve controlling the connection, and a piston arranged in said housing and adapted for actuation by pressure developed by fluid passing through said housing to open and close said valve under predetermined conditions.

4. A device of the character described, comprising a housing, said housing having a suction connection, a vacuum connection, a plurality of unlike fluid channels connecting said suction connection and said vacuum connection, and at least one connection to the outside air, an alarm device in said last mentioned connection, and mechanical means for controlling said last-named connection arranged in said housing and for control to operate under predetermined conditions by fluid passing through said fluid channels.

5. A device of the character described, comprising a housing, said housing having a suction connection, a vacuum connection, a plurality of fluid channels having unlike capacities and connecting said suction connection and said vacuum connection, and at least one connection to the outside air, an alarm device in said last-named connection, and mechanism for controlling said last-named connection including a piston arranged in said housing and for control by fluid passing between one of said connections and said fluid channels.

6. A device of the character described, comprising a housing, said housing having a suction connection, a vacuum connection, and at least one connection to the outside air, an alarm device in said last-named connection, mechanism for controlling said last-named connection arranged in said housing and adapted to open same under predetermined conditions, and yieldable means for holding said mechanism in a closed position under normal operating conditions.

7. A fuel signal device comprising, a body, a signal associated with said body, and mechanical means in said body for controlling said signal, said mechanical means being controlled by variations in fluid pressure developed within said body and by fluid in passing through the signal device.

8. A fuel signal device comprising, a body, a signal associated with said body, signal operating mechanism in said body, and a plurality of channels of unlike capacity in said body for conducting fluid and adapted to determine the action of said signal operating mechanism.

9. A fuel signal device comprising, a body, a signal associated with said body, signal operating mechanism in said body, and a plurality of fluid channels in said body for determining the action of said signal operating mechanism, one of said channels being variable to facilitate adjustment.

10. A fuel signal device comprising, a body, a signal associated with said body, signal operating mechanism in said body, and means in said body for operating said mechanism including a variable fluid channel.

11. A fuel signal device comprising, a body, a signal associated with said body, signal operating mechanism in said body, means in said body for operating said mechanism including a variable fluid channel, and means for adjusting said variable fluid channel including a device associated with said body and adjustable thereto.

12. A fuel signal device comprising, a body, an alarm device associated with said body, a valve in said body and adapted to control said alarm device, and means for operating said valve, said means including a piston associated with said valve, a cylinder in said body, and a plurality of fluid channels in said body and communicating with said cylinder.

13. A fuel signal, comprising in combination, a body, an alarm device associated with said body, and mechanism in said body for controlling said alarm, said mechanism being arranged for horizontal controlling movement.

14. A fuel signal, comprising in combination, a body, an alarm device associated with said body, mechanism controlling said alarm, and means for applying atmospheric pressure to said mechanism including a plunger engaging said mechanism and arranged to control operating movement thereof.

15. A fuel signal device, comprising in combination, a body, an alarm device associated with said body, means for controlling said alarm device including a piston, and mechanical means for applying atmospheric pressure to said piston for effecting operating movement thereof.

16. A fuel signal device, comprising in combination, a body, an alarm device associated with said body, operating means for actuating said alarm device including a piston, means for applying atmospheric pressure to one side of said piston, and balanced fluid channels in said body arranged to cause movement of said piston against the atmospheric pressure under predetermined conditions.

17. A fuel signal device, comprising, a body having a suction connection, a vacuum connection, and a connection to the outside air, an alarm device associated with said body, at least one continuously open fluid channel in said body and extending between said suction and vacuum connections, and mechanism arranged for limited movement in said fluid channel and constructed for manipulating said alarm device and for control by fluid in passing through said body.

18. A liquid supply indicator, comprising, a body having a suction connection and adapted to receive air, an indicator associated therewith, a mechanical device for controlling said indicator, and means proportionately dividing air passing through said body for causing predetermined actuation of said mechanical device.

19. A signal device of the character described comprising, a body having a suction connection and a vacuum connection, means associated therewith for indicating at least two conditions of a fuel supply, devices operable by pressure for actuating said means, and fluid directing means for affecting control of said devices whereby either one of the conditions may be indicated.

RAYMOND D. SCHNOOR.